US012428355B2

(12) United States Patent
Liu et al.

(10) Patent No.: US 12,428,355 B2
(45) Date of Patent: Sep. 30, 2025

(54) INTEGRATED-PREPARATION AND APPLICATION METHODS OF UREA-FORMALDEHYDE (UF)-BASED MULTI-NUTRIENT BIODEGRADABLE POLYMERIC SLOW-RELEASE (SR) LIQUID AND GRANULAR FERTILIZERS

(71) Applicant: NORTH UNIVERSITY OF CHINA, Taiyuan (CN)

(72) Inventors: Yaqing Liu, Taiyuan (CN); Yang Xiang, Taiyuan (CN); Wenqi Wang, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 19/024,680

(22) Filed: Jan. 16, 2025

(65) Prior Publication Data

US 2025/0154075 A1 May 15, 2025

Related U.S. Application Data

(63) Continuation of application No. PCT/CN2024/090048, filed on Apr. 26, 2024.

(30) Foreign Application Priority Data

Apr. 22, 2024 (CN) .......................... 202410483390.6

(51) Int. Cl.
*C05C 9/02* (2006.01)
*C05B 1/00* (2006.01)
(Continued)

(52) U.S. Cl.
CPC .................. *C05C 9/02* (2013.01); *C05B 1/00* (2013.01); *C05C 9/005* (2013.01); *C05D 1/00* (2013.01); *C05G 5/12* (2020.02); *C05G 5/20* (2020.02)

(58) Field of Classification Search
CPC .. C05C 9/02; C05C 9/005; C05B 1/00; C05D 1/00; C05G 5/12; C05G 5/20
See application file for complete search history.

(56) References Cited

U.S. PATENT DOCUMENTS

| 4,411,683 A | 10/1983 | Goertz |
| 2019/0218152 A1* | 7/2019 | Zhao ....................... C05B 19/00 |

FOREIGN PATENT DOCUMENTS

| CN | 103130580 A | 6/2013 |
| CN | 105541419 A | 5/2016 |

(Continued)

*Primary Examiner* — Jennifer A Smith (57) ABSTRACT

A method for integrally preparing urea-formaldehyde (UF)-based multi-nutrient biodegradable polymeric slow-release (SR) liquid and granular fertilizers is provided. A hydroxymethylurea solution is prepared, and a part of the hydroxymethylurea solution is added to a reactor for reaction to obtain the UF-based multi-nutrient biodegradable polymeric SR liquid fertilizer. The rest of the hydroxymethylurea solution is fed into a reaction-extrusion integrated machine for reactive extrusion to obtain a UF polymer through the polycondensation reaction, which is extruded, dried and granulated to obtain the UF-based multi-nutrient biodegradable polymeric SR granular fertilizer. A method for applying such liquid and granular fertilizers is also provided.

8 Claims, 7 Drawing Sheets

(51) Int. Cl.
    *C05C 9/00*           (2006.01)
    *C05D 1/00*           (2006.01)
    *C05G 5/12*            (2020.01)
    *C05G 5/20*            (2020.01)

(56) References Cited

FOREIGN PATENT DOCUMENTS

| | | |
|---|---|---|
| CN | 112174729 A | 1/2021 |
| CN | 112778023 A | 5/2021 |
| CN | 112898053 A | 6/2021 |
| CN | 115849959 A | 3/2023 |
| CN | 115947954 A | 4/2023 |
| CN | 116425588 A | 7/2023 |
| CN | 116789469 A | 9/2023 |
| GB | 1180884 A | 2/1970 |

\* cited by examiner

INTEGRATED-PREPARATION AND APPLICATION METHODS OF UREA-FORMALDEHYDE (UF)-BASED MULTI-NUTRIENT BIODEGRADABLE POLYMERIC SLOW-RELEASE (SR) LIQUID AND GRANULAR FERTILIZERS

CROSS-REFERENCE TO RELATED APPLICATIONS

This application is a continuation of International Patent Application No. PCT/CN2024/090048, filed on Apr. 26, 2024, which claims the benefit of priority from Chinese Patent Application No. 202410483390.6, filed on Apr. 22, 2024. The content of the aforementioned application, including any intervening amendments thereto, is incorporated herein by reference in its entirety.

TECHNICAL FIELD

This application relates to slow- and controlled-release fertilizers (S-CRF), and more particularly to application and integrated-preparation methods of a urea-formaldehyde (UF)-based multi-nutrient biodegradable polymeric slow-release (SR) liquid and granular fertilizers.

BACKGROUND

To address the problem of low nutrient utilization efficiency of traditional fertilizers, slow- and controlled release fertilizers (S-CRFs) have become a hot spot in current fertilizer research and application. As the first slow-release fertilizer that has been successfully developed and commercialized, urea-formaldehyde (UF) slow-release nitrogen fertilizer is also the most promising kind of S-CRFs, which is significant for promoting the upgrading of nitrogen fertilizer industry and alleviating pressure on energy and environment.

The commonly used methods for preparing UF fertilizer mainly include a dilute solution method and a concentrated solution method. In the dilute solution method, urea and formaldehyde are reacted in the form of a dilute solution to generate a UF suspension, followed by solid-liquid separation, drying, and crushing to obtain the final product, and the mother liquor is recycled. The method has a good product quality, but it is complex and high-cost, and is thus difficult to achieve large-scale mass production. In contrast, in the concentrated solution method, urea and formaldehyde are reacted in the form of a concentrated solution, and the intermediate product is not subjected to the solid-liquid separation, but rather being directly cured into final products by adding a catalyst (curing agent). This method is simple and low-cost, but the obtained high-viscosity UF fertilizer is difficult to be automatically discharged from the reaction device. Hence, the concentrated solution method can only for small-batch production or even stay in the laboratory stage at present. Difficulty in automatic discharging from the reaction device has currently become a primary factor that hinders the application of the UF polymerization to the industrial and continuous production. Therefore, how to achieve the automatic discharging of the high-viscosity UF after the polymerization reaction has become the technical key to the continuous production of UF fertilizer.

Chinese Patent Application Nos. 202311054388.9 and 202310237417.9 have disclosed the use of reactive extrusion technology to realize the production of UF granular fertilizers, which can effectively achieve the continuous production of high-viscosity UF. However, with the development of integrated water and fertilizer technology, liquid fertilizers have been increasingly popularized due to fast absorption, flexible formulation, free of environmental pollution, convenient application, and remarkable effect. To adapt to this trend, UF liquid fertilizer has been developed. At present, UF liquid fertilizer is mainly divided into two categories, i.e., clear-liquid UF fertilizer and UF liquid suspension fertilizer. The clear-liquid UF fertilizer is clear and transparent, and mainly contains soluble triazinone compounds, hydroxymethylurea, and fast-acting nitrogen fertilizer. However, it has a limited nitrogen slow-release effect, a poor storage stability, and a high requirement for ambient temperature, and is prone to precipitation and deterioration. The UF liquid suspension fertilizer is prepared by controlling the reaction of urea and formaldehyde in the presence of a suspending agent to generate a UF polymer with a relatively low molecular weight. The suspension system is turbid, and has a high viscosity. However, the existing UF liquid suspension fertilizers are obtained by frequently adjusting the acidity and alkalinity of the reaction system to control the polymerization degree of UF, which results in cumbersome operation and difficult quality control.

SUMMARY

An objective of the present disclosure is to provide a method for integrated-preparing urea-formaldehyde (UF)-based multi-nutrient biodegradable polymeric slow-release (SR) liquid and granular fertilizers, and an application method of the fertilizers prepared thereby to overcome the deficiencies in the prior art.

Technical solutions of the present disclosure are described below.

In a first aspect, this application provides a method for integrated preparation of a UF-based multi-nutrient biodegradable polymeric SR liquid fertilizer and a UF-based multi-nutrient biodegradable polymeric SR granular fertilizer, comprising:

(1) adding urea, formaldehyde, a catalyst, and water to a first reactor followed by a reaction at 50-90° C. for 0.5-3 h to obtain a hydroxymethylurea solution; wherein a molar ratio of the urea to the formaldehyde is 1.2-5:1; the catalyst is 0-5%, excluding 0%, of a total weight of the urea and the formaldehyde; and the water in the first reactor is 15-35% of the total weight of the urea and the formaldehyde; and (2) adding a first portion of the hydroxymethylurea solution obtained in step (1) to a second reactor containing an acidic suspension followed by a reaction at a first temperature $T_1$ for a first time $t_1$ to obtain a viscous UF liquid, wherein the acidic suspension is prepared from an acidic substance, water, and a suspending agent; and adding the viscous UF liquid to a mixed liquid prepared from an alkaline substance, a first fertilizer system containing at least one nutrient element except nitrogen, and a nutrient synergist, followed by mixing to obtain the UF-based multi-nutrient biodegradable polymeric SR liquid fertilizer; and feeding a second portion of the hydroxymethylurea solution obtained in step (1) and a second fertilizer system containing at least one nutrient element except nitrogen into a twin-screw reaction extruder of a reaction unit of a reaction-extrusion integrated machine, followed by reactive extrusion at a second temperature $T_2$ and a first screw speed $R_1$ for a second time $t_2$ to form a reaction mixture, wherein during the reactive extrusion process, hydroxymethylurea is transformed into a UF polymer through a polycondensation reaction; conveying, by the twin-screw reaction extruder, the reaction mixture to a twin-screw extruder of an extrusion unit of the reaction-extrusion integrated machine followed by extrusion at a third temperature $T_3$ and a second screw speed $R_2$ to obtain a strip-shaped extrudate; drying the strip-shaped extrudate at a fourth temperature $T_4$, followed by granulation to obtain the UF-based multi-nutrient biodegradable polymeric SR granular fertilizer.

In an embodiment, in step (1), the formaldehyde is selected from the group consisting of a formaldehyde aqueous solution, a solid paraformaldehyde, gaseous formaldehyde, and a combination thereof; and the catalyst is potassium carbonate, potassium hydroxide, or a combination thereof.

In an embodiment, in step (2), the first portion of the hydroxymethylurea solution is added to the acidic suspension by drip addition, mist spraying, or pouring; the acidic substance is an inorganic acid or an organic acid, and is selected from the group consisting of sulfuric acid, hydrochloric acid, phosphoric acid, oxalic acid, citric acid, tartaric acid, and a combination thereof; in the acidic suspension, the acidic substance is 0-80 wt. %, except 0 wt. %, of the water; the suspending agent is an inorganic suspending agent or an organic suspending agent, and is selected from the group consisting of attapulgite, bentonite, kaolin, lignin, humic acid, alginic acid, polyvinyl alcohol, colloidal protein, xanthan gum, cellulose, starch, and a combination thereof; and the suspending agent is 0-5 wt. %, except 0 wt. %, of the water.

In an embodiment, in step (2), the first temperature $T_1$ ranges from 25° C. to 90° C., and the first time $t_1$ is 0.1-2 h.

In an embodiment, in step (2), the alkaline substance is an inorganic base or an organic base, and is selected from the group consisting of sodium hydroxide, potassium hydroxide, potassium carbonate, potassium phosphate, an organic amine compound, and a combination thereof; and an addition amount of the alkaline substance depends on a pH required for a target soil area or the UF-based multi-nutrient biodegradable polymeric SR liquid fertilizer.

In an embodiment, in step (S2), the second temperature $T_2$ is 50-130° C.; the first screw speed $R_1$ is 5-150 rpm; the second time $t_2$ is 1-30 min; the third temperature $T_3$ is 50-130° C.; the second screw speed $R_2$ is 5-150 rpm; and the fourth temperature $T_4$ is 60-150° C.

In an embodiment, in step (2), the first fertilizer system and the second fertilizer system are independently selected from the group consisting of a phosphate, a potassium salt, a medium-trace-element fertilizer, and a combination thereof; the phosphate is selected from the group consisting of hydroxyapatite, ammonium dihydrogen phosphate, calcium superphosphate, potassium dihydrogen phosphate, and a combination thereof; the potassium salt is selected from the group consisting of potassium sulphate, potassium chloride, potassium nitrate, potassium carbonate, and a combination thereof; and the medium-trace-element fertilizer is selected from the group consisting of calcium sulfate, magnesium sulfate, ferrous sulfate, manganese sulfate, zinc sulfate, copper sulfate, boric acid, sodium silicate, potassium silicate, and a combination thereof; and the nutrient synergist is selected from the group consisting of a humic acid, an amino acid, a seaweed extract, gibberellin, auxin, and a combination thereof.

In an embodiment, step (S2) further comprises:
sealing a die opening between the reaction unit and the extrusion unit before feeding the second portion of the hydroxymethylurea solution obtained in step (1) into the twin-screw reaction extruder; and
after feeding the second portion of the hydroxymethylurea solution into the twin-screw reaction extruder, turning on the screws of the twin-screw reaction extruder, and simultaneously starting a vacuumization-devolatilization device of the twin-screw reaction extruder to remove water in the reaction mixture; opening the die opening between the reaction unit and the extrusion unit; and turning on the twin-screw extruder of the extrusion unit such that the reaction mixture is conveyed by the twin-screw reaction extruder to the twin-screw extruder.

In a second aspect, this application provides a method of applying a UF-based multi-nutrient biodegradable polymeric SR liquid fertilizer prepared by the aforementioned method, comprising:
applying the UF-based multi-nutrient biodegradable polymeric SR liquid fertilizer to a target soil at a dosage of 8-15 kg of nitrogen/mu through foliar spraying, seed dipping, root dipping, injection, drenching, watering, sprinkler irrigation, drip irrigation, or a combination thereof.

In a third aspect, this application provides a method of applying a UF-based multi-nutrient biodegradable polymeric SR granular fertilizer or a combination of the UF-based multi-nutrient biodegradable polymeric SR granular fertilizer and a UF-based multi-nutrient biodegradable polymeric SR liquid fertilizer prepared by the aforementioned method, comprising:
applying the UF-based multi-nutrient biodegradable polymeric SR granular fertilizer to a target soil at a dosage of 8-15 kg of nitrogen/mu while performing sowing; or
applying the UF-based multi-nutrient biodegradable polymeric SR granular fertilizer and spraying the UF-based multi-nutrient biodegradable polymeric SR liquid fertilizer to the target soil while performing sowing, wherein a total dosage of the UF-based multi-nutrient biodegradable polymeric SR granular fertilizer and the UF-based multi-nutrient biodegradable polymeric SR liquid fertilizer is 8-15 kg of nitrogen/mu.

Compared with the prior art, the present disclosure has at least the following beneficial effects.

(1) The UF-based multi-nutrient biodegradable polymeric SR liquid fertilizer produced by the method of the present disclosure has good fluidity, and is not prone to caking after long-term storage. Moreover, it has a good dispersibility, and can be mixed uniformly with irrigation water in any proportion. It also has a good stability, and a low sedimentation rate after mixed with irrigation water for a long time, and thus will not block the irrigation system.

(2) At present, the granulation in the preparation of UF granular fertilizer is still commonly achieved by using the crude crushing granulation method, which has defects such as serious dust pollution and irregular grain shape distribution. By comparison, the UF-based multi-nutrient biodegradable polymeric SR granular fertilizer produced by the method of the present disclosure is regular in particle shape and is free of dust pollution in the production process. Moreover, it can be produced continuously, thereby reducing the consumption of labor and material.

(3) Regarding the UF-based multi-nutrient biodegradable polymeric SR liquid and granular fertilizers produced by the method of the present disclosure, the contents of macro-, medium-, and micro-nutrients can be flexibly adjusted according to the growth needs of crops, so as to satisfy the demand for macro-, medium-, and micro-nutrients in the whole growth cycle of the crops.

(4) The present disclosure realizes the production of UF-based multi-nutrient biodegradable polymeric SR liquid and granular fertilizers on a single set of equipment. Moreover, the production process is simple and environmentally friendly, and is easy to satisfy the needs of different regions for different fertilizer forms.

BRIEF DESCRIPTION OF THE DRAWINGS

The accompanying drawings herein, which are incorporated into and form a part of the specification, show embodiments in accordance with the present disclosure and are used in conjunction with the specification to explain the principles of the present disclosure.

To illustrate the technical solutions in the embodiments of the present disclosure or in the prior art more clearly, the accompanying drawings required in the present disclosure or in the prior art will be briefly described below. Obviously, other accompanying drawings can be obtained by one of ordinary skill in the art from these drawings without making creative effort.

DETAILED DESCRIPTION OF EMBODIMENTS

To enable a clearer understanding of the above objects, features and advantages of the present disclosure, the embodiments of the present disclosure will be further described below. It is to be noted that the embodiments of the present disclosure and the features in the embodiments may be combined with each other without conflict.

Many specific details are set forth in the following description to better understand the present disclosure, but the present disclosure may also be practiced in other ways than those described herein. Obviously, the embodiments in the specification are only a part of the embodiments of the present disclosure.

The performance testing and characterization used in the present disclosure are performed using the following criteria.

(1) The UF-based multi-nutrient biodegradable polymeric SR liquid fertilizer is freeze-dried, ground, and crushed, and meshed with a 0.25-mm sieve to obtain a liquid fertilizer powder sample to be tested. The UF-based multi-nutrient biodegradable polymeric SR solid granular fertilizer is directly ground and pulverized, and meshed with a 0.25-mm sieve to obtain a solid fertilizer powder sample to be tested. A small amount of dried powder sample is mixed with KBr powder and pressed, and then tested with an infrared spectrometer (Nicolet IS50) with a scanning range of 500-4000 cm$^{-1}$ to obtain FTIR spectra. XRD analysis of the sample powder is performed by using an X-ray diffractometer (HAOYUAN DX-2700B) with a scanning range of 5-80°. Thermal stability of the powder samples is measured by using a thermogravimetric analyzer (TA Q50) under a nitrogen atmosphere, where the temperature range is 30-800° C., a heating rate is 10° C./min, and a nitrogen flow rate is 40 mL/min. Surface morphologies of the fertilizers are observed using a scanning electron microscope (Hitachi SU8010), where the liquid fertilizer suspension is diluted 100 times, and then added dropwise onto a silicon wafer for observation with the scanning electron microscope, and the solid granular fertilizer is directly observed with the scanning electron microscope.

(2) The slow-release performance tests are described as follows. The release performance and the initial release rate of the nitrogen nutrient are characterized by hydrostatic release test. 5 mL of the UF-based multi-nutrient biodegradable polymeric SR liquid fertilizer is added directly into a bottle containing 100 mL of deionized water, followed by shaking up and down for three times, incubation in a constant temperature water bath at 25° C., and sampling at 1, 3, 5, 7, 10, 14, and 28 days. When sampling, the supernatant liquid is sucked up with a pipette and filtered with filter paper. 20 mL of filtrate is taken and subjected to heating digestion with a sulfuric acid-hydrogen peroxide method. The nitrogen content is measured by Kjeldahl nitrogen determination method to calculate the cumulative release rate of nutrients, and the test result at the first day is the initial release rate. 5.0 g of the UF-based multi-nutrient biodegradable polymeric SR solid granular fertilizer is packed and sealed with a 100-mesh nylon mesh, and put into a bottle containing 100 mL of deionized water for incubation in a constant temperature water bath at 25° C. Samples are taken on days 1, 3, 5, 7, 10, 14, and 28. When sampling, the nylon mesh bag is placed at the mouth of the bottle to drain off the water with tweezers, and then placed into a new bottle with 100 mL deionized water to continue incubation after there is no water droplet. The original culture bottle is turned up and down to ensure the consistent concentration of solution in the bottle. 20 mL of solution is taken and subjected to heating digestion with by the sulfuric acid-hydrogen peroxide method. The nitrogen content is measured by Kjeldahl nitrogen determination method to calculate the cumulative release rate of nutrients, and the test result at the first day is the initial release rate.

In a first aspect, this application provides a method for integrated-preparing a urea-formaldehyde (UF)-based multi-nutrient biodegradable polymeric slow-release (SR) liquid fertilizer and a UF-based multi-nutrient biodegradable polymeric SR granular fertilizer, which includes the following steps.

(1) Urea, formaldehyde, a catalyst, and water are added to a reactor A followed by reaction at 50-90° C. for 0.5-3 h to obtain a hydroxymethylurea solution, where a molar ratio of the urea to the formaldehyde is 1.2-5:1; an addition amount of the catalyst is 0-5% of a total weight of the urea and the formaldehyde, excluding 0%; and the water content in the reactor A is 15-35% of the total weight of the urea and the formaldehyde.

(2) A first portion of the hydroxymethylurea solution obtained in step (1) is added to a reactor B containing an acidic suspension, which is prepared from an acidic substance, water, and a suspending agent, followed by reaction at a first temperature $T_1$ for a first time $t_1$ to obtain a viscous UF liquid. The viscous UF liquid is added to a mixed liquid prepared from an alkaline substance, a fertilizer system containing at least one nutrient element except nitrogen, and a nutrient synergist, followed by uniform mixing to obtain the UF-based multi-nutrient biodegradable polymeric SR liquid fertilizer.

At the same time, a second portion of the hydroxymethylurea solution obtained in step (1) and a second fertilizer system containing at least one nutrient element except nitrogen are pumped into a twin-screw reaction extruder of a reaction unit of a reaction-extrusion integrated machine, followed by reactive extrusion at a second temperature $T_2$ and a first screw speed $R_1$ for a second time $t_2$ to form a reaction mixture, where during the reactive extrusion process, hydroxymethylurea is transformed into a UF polymer through a polycondensation reaction. The reaction mixture is conveyed to a twin-screw extruder of an extrusion unit of the reaction-extrusion integrated machine by the twin-screw reaction extruder, and extruded by the twin-screw extruder at a third temperature $T_3$ and a second screw speed $R_2$ to obtain a strip-shaped extrudate. The strip-shaped extrudate is dried at a fourth temperature $T_4$, followed by granulation to obtain the UF-based multi-nutrient biodegradable polymeric SR solid granular fertilizer.

In an embodiment, in step (1), the formaldehyde is selected from the group consisting of a formaldehyde aqueous solution, a solid paraformaldehyde, gaseous formaldehyde, and a combination thereof; and the catalyst is potassium carbonate, potassium hydroxide, or a combination thereof.

In an embodiment, in step (2), the first portion of the hydroxymethylurea solution is added to the acidic suspension by dripping, mist spraying, or pouring; the acidic substance is an inorganic acid or an organic acid; in the acidic suspension, the acidic substance is 0-80 wt. %, except 0 wt. %, of the water; the suspending agent is an inorganic suspending agent or an organic suspending agent; and an addition amount of the suspending agent added is 0-5 wt. %, except 0 wt. %, of the water added in step (2). The acidic substance is selected from the group consisting of sulfuric acid, hydrochloric acid, phosphoric acid, oxalic acid, citric acid, tartaric acid, and a combination thereof. The suspending agent is selected from the group consisting of attapulgite, bentonite, kaolin, lignin, humic acid, alginic acid, polyvinyl alcohol, colloidal protein, xanthan gum, cellulose, starch, and a combination thereof;

In an embodiment, in step (2), the first temperature $T_1$ ranges from 25° C. to 90° C., and the first time $t_1$ is 0.1-2 h.

In an embodiment, in step (2), the alkaline substance is an inorganic base or an organic base, and is selected from the group consisting of sodium hydroxide, potassium hydroxide, potassium carbonate, potassium phosphate, an organic amine compound, and a combination thereof; and an addition amount of the alkaline substance depends on a pH required for different soils or liquid fertilizers.

In an embodiment, in step (S2), the second temperature $T_2$ is 50-130° C.; the first screw speed $R_1$ is 5-150 rpm; the second time $t_2$ is 1-30 min; the third temperature $T_3$ is 50-130° C.; the second screw speed $R_2$ is 5-150 rpm; and the fourth temperature $T_4$ is 60-150° C.

In an embodiment, in step (2), the first fertilizer system and the second fertilizer system are independently selected from the group consisting of a phosphate, a potassium salt, a medium-trace-element fertilizer, and a combination thereof; the phosphate is selected from the group consisting of hydroxyapatite, ammonium dihydrogen phosphate, calcium superphosphate, potassium dihydrogen phosphate and a combination thereof; the potassium salt is selected from the group consisting of potassium sulphate, potassium chloride, potassium nitrate, potassium carbonate, and a combination thereof; and the medium-trace-element fertilizer is selected from the group consisting of calcium sulphate, magnesium sulphate, ferrous sulfate, manganese sulfate, zinc sulfate, copper sulfate, boric acid, sodium silicate, potassium silicate, and a combination thereof; and the nutrient synergist is selected from the group consisting of a humic acid, an amino acid, a seaweed extract, gibberellin, auxin, and a combination thereof.

In an embodiment, step (S2) further includes the following steps. A die opening between the reaction unit and the extrusion unit of the reaction-extrusion integrated machine is sealed before pumping the second portion of the hydroxymethylurea solution obtained in step (1) into the twin-screw reaction extruder. After feeding the second portion of the hydroxymethylurea solution obtained in step (1) into the twin-screw reaction extruder, the screws of the twin-screw reaction extruder are turned on, and simultaneously a vacuumization-devolatilization device of the twin-screw reaction extruder is started to remove water in the reaction mixture. The die opening between the reaction unit and the extrusion unit is opened. The twin-screw extruder of the extrusion unit is turned on such that the reaction mixture is conveyed to the twin-screw extruder by the twin-screw reaction extruder.

In a second aspect, this application provides a method of applying a UF-based multi-nutrient biodegradable polymeric SR liquid fertilizer prepared by the aforementioned method, which includes the following steps.

The UF-based multi-nutrient biodegradable polymeric SR liquid fertilizer is applied to a target soil at a dosage of 8-15 kg of nitrogen/mu through foliar spraying, seed dipping, root dipping, injection, drenching, watering, sprinkler irrigation, drip irrigation, or a combination thereof.

In a third aspect, this application provides a method of applying a UF-based multi-nutrient biodegradable polymeric SR granular fertilizer or a combination of the UF-based multi-nutrient biodegradable polymeric SR granular fertilizer and a UF-based multi-nutrient biodegradable polymeric SR liquid fertilizer prepared by the method using a seed and fertilizer co-sowing integrated machine, which includes the following steps.

The UF-based multi-nutrient biodegradable polymeric SR granular fertilizer is applied to a target soil at a dosage of 8-15 kg of nitrogen/mu while performing sowing; or the UF-based multi-nutrient biodegradable polymeric SR granular fertilizer is applied and the UF-based multi-nutrient biodegradable polymeric SR liquid fertilizer is sprayed simultaneously to the target soil while performing sowing, where a total dosage of the UF-based multi-nutrient biodegradable polymeric SR granular fertilizer and the UF-based multi-nutrient biodegradable polymeric SR liquid fertilizer is 8-15 kg of nitrogen/mu.

The specific examples of the present disclosure are described below.

Example 1

A method for integrated-preparing a urea-formaldehyde (UF)-based multi-nutrient biodegradable polymeric slow-release (SR) liquid fertilizer and a UF-based multi-nutrient biodegradable polymeric SR granular fertilizer, which included the following steps.
(1) Urea, a 37 wt. % formaldehyde solution, catalyst potassium hydroxide, and water were added to a reactor A followed by reaction at 80° C. for 2 h to obtain a hydroxymethylurea solution, where an addition amount of the potassium hydroxide was 0.5% of a total weight of the urea and the formaldehyde, and the water content in the reactor A was 35% of the total weight of the urea and the formaldehyde.

One half of the hydroxymethylurea solution obtained in step (1) was added to a reactor B containing an acidic suspension, which was prepared from sulfuric acid, water, and suspension agent attapulgite, followed by reaction at 25° C. for 0.5 h to obtain a viscous UF liquid, where a sulfuric acid solute was 20 wt. % of the added water, and the addition amount of the attapulgite was 1 wt. % of the water. The viscous UF liquid was added to a mixed liquid prepared from sodium hydroxide, ammonium dihydrogen phosphate, and nutrient enhancer humic acid, followed by uniform mixing to obtain the UF-based multi-nutrient biodegradable polymeric SR liquid fertilizer, where a molar ratio of sodium hydroxide to sulfuric acid added to the acidic suspension was 2:1, a weight ratio of the ammonium dihydrogen phosphate to the urea in step (1) was 1:2, and a weight ratio of the humic acid to the urea in step (1) was 0.1:1.

The die opening between the reaction unit and the extrusion unit of a reaction-extrusion integrated machine was sealed. Then, the other half of the hydroxymethylurea solution obtained in step (1) and the ammonium dihydrogen phosphate were fed into a twin-screw reaction extruder of the reaction unit of the reaction-extrusion integrated machine, where a weight ratio of the ammonium dihydrogen phosphate to the urea in step (1) was 1:2. Screws of the twin-screw reaction extruder were turned on for reactive extrusion at 80° C. and 50 rpm for 30 min, and simultaneously a vacuumization-devolatilization device of the twin-screw reaction extruder was started to remove water in the reaction mixture, during which the hydroxymethylurea was transformed into a UF polymer through a polycondensation reaction. After that, the die opening between the reaction unit and the extrusion unit was opened, and the twin-screw extruder of the extrusion unit was turned on. The reaction mixture was conveyed to the twin-screw extruder by the twin-screw reaction extruder and extruded by the twin-screw extruder at 60° C. and 50 rpm to obtain a strip-shaped extrudate. The strip-shaped extrudate was dried at 80° C., followed by granulation to obtain the UF-based multi-nutrient biodegradable polymeric SR granular fertilizer.

The prepared UF-based multi-nutrient biodegradable polymeric SR liquid fertilizer contained 18.8 g/L of N and 11.5 g/L of $P_2O_5$, and had an initial nitrogen nutrient release rate of 26.3%. When planting corn, the UF-based multi-nutrient biodegradable polymeric SR liquid fertilizer was applied using a liquid fertilizer sprayer with a dosage of 80 L/mu.

The prepared UF-based multi-nutrient biodegradable polymeric SR granular fertilizer contained 30.2 wt. % of N and 18.5 wt. % of $P_2O_5$, and had an initial nitrogen nutrient release rate of 22.8%. When planting corn, the UF-based multi-nutrient biodegradable polymeric SR solid granular fertilizer was applied by using a seed and fertilizer co-sowing integrated machine with a dosage of 50 kg/mu.

Example 2

A method for integrated-preparing a UF-based multi-nutrient biodegradable polymeric SR liquid fertilizer and a UF-based multi-nutrient biodegradable polymeric SR granular fertilizer, which included the following steps.
(1) Urea, paraformaldehyde, potassium hydroxide, and water were added to a reactor A followed by reaction at 70° C. for 2 h to obtain a hydroxymethylurea solution, where a molar ratio of the urea to the formaldehyde structural unit contained in paraformaldehyde was 1.5:1, an addition amount of the potassium hydroxide was 0.1% of a total weight of the urea and the paraformaldehyde, and the water content in the reactor A was 30% of the total weight of the urea and the paraformaldehyde.
(2) One half of the hydroxymethylurea solution obtained in step (1) was added to a reactor B containing an acidic suspension, which was prepared from sulfuric acid, water, and xanthan gum, for reaction at 60° C. for 0.3 h to obtain a viscous UF liquid, where a sulfuric acid solute was 20 wt. % of the added water, and the addition amount of the xanthan gum was 0.3 wt. % of the water. The viscous UF liquid was added to a mixed liquid prepared from sodium hydroxide, ammonium dihydrogen phosphate, potassium sulfate, and an amino acid, followed by uniform mixing to obtain the UF-based multi-nutrient biodegradable polymeric SR liquid fertilizer, where a molar ratio of sodium hydroxide to sulfuric acid added to the acidic suspension was 3:1, a weight ratio of the ammonium dihydrogen phosphate to the urea in step (1) was 1:5, a weight ratio of the potassium sulfate to the ammonium dihydrogen phosphate was 1:3, and a weight ratio of the amino acid to the urea in step (1) was 0.5:1.

The die opening between the reaction unit and the extrusion unit of a reaction-extrusion integrated machine was sealed. Then, the other half of the hydroxymethylurea solution obtained in step (1), the ammonium dihydrogen phosphate and the potassium sulfate were fed into a twin-screw reaction extruder of the reaction unit of the reaction-extrusion integrated machine, where a weight ratio of the ammonium dihydrogen phosphate to the urea in step (1) was 1:5, and a weight ratio of the potassium sulfate to the ammonium dihydrogen phosphate was 1:3. A screw of the twin-screw reaction extruder was turned on for reactive extrusion at 100° C. and 60 rpm for 30 min, and simultaneously a vacuumization-devolatilization device of the twin-screw reaction extruder was started to remove water in the reaction mixture, during which the hydroxymethylurea was transformed into a UF polymer through a polycondensation reaction. After that, the die opening between the reaction unit and the extrusion unit was opened, and the twin-screw extruder of the extrusion unit was turned on. The reaction mixture was conveyed to the twin-screw extruder by the twin-screw reaction extruder and extruded by the twin-screw extruder at 50° C. and 60 rpm to obtain a strip-shaped extrudate. The strip-shaped extrudate was dried at 100° C., and granulated to obtain the UF-based multi-nutrient biodegradable polymeric SR granular fertilizer.

The prepared UF-based multi-nutrient biodegradable polymeric SR liquid fertilizer contained 18.05 g/L of N, 10.9 g/L of $P_2O_5$, and 12.9 g/L of $K_2O$, and had an initial nitrogen nutrient release rate of 27.05%. When planting corn, the UF-based multi-nutrient biodegradable polymeric SR liquid fertilizer was applied using a liquid fertilizer sprayer with a dosage of 85 L/mu.

The prepared UF-based multi-nutrient biodegradable polymeric SR solid granular fertilizer contained 35.22 wt. % of N, 12.58 wt. % of $P_2O_5$ and 8.45 g/L of $K_2O$, and had an initial nitrogen nutrient release rate of 23.65%. When planting corn, the UF-based multi-nutrient biodegradable polymeric SR solid granular fertilizer was applied by using a seed and fertilizer co-sowing integrated machine with a dosage of 42.5 kg/mu.

Figure 1:
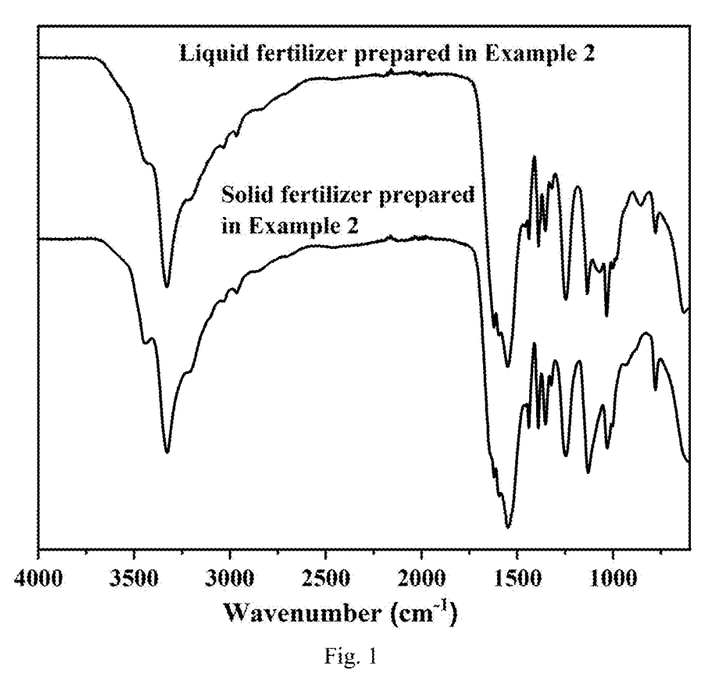
FIG. 1 shows Fourier transform infrared (FTIR) spectra of urea-formaldehyde (UF)-based multi-nutrient biodegradable polymeric slow-release (SR) liquid and granular fertilizers prepared in Example 2 within 500-4000 cm$^{-1}$.

As shown in FIG. 1, both liquid fertilizer and solid fertilizer prepared in this embodiment showed a strong —NH— stretching vibration absorption peak at 3327 cm$^{-1}$, which belonged to the —NHCONH—CH$_2$— chain segment of UF, indicating that UF molecule chain existed in both liquid fertilizer and solid fertilizer. In addition, both liquid fertilizer and solid fertilizer showed a characteristic absorption peak at 1132 cm$^{-1}$ attributing to the —NH—CH$_2$—NH— methylene bridge bond asymmetric stretching vibration, and a characteristic absorption peak at 1023 cm$^{-1}$ attributing to the —CH$_2$—O—CH$_2$—methylene ether bond stretching vibration. The intensity ratio $A_{1023}/A_{1132}$ of the characteristic absorption peaks of the liquid fertilizer was significantly larger than that of the solid fertilizer, which indicated that under the catalysis of the strong acid, the hydroxymethylurea in the liquid fertilizer formed more methylene ether bonds through the polycondensation reaction, that is, more cross-linking structures were formed in the liquid fertilizer, while more linear structures were formed in the solid fertilizer. The FTIR spectra illustrated that the product had the described structure.

Figure 2:
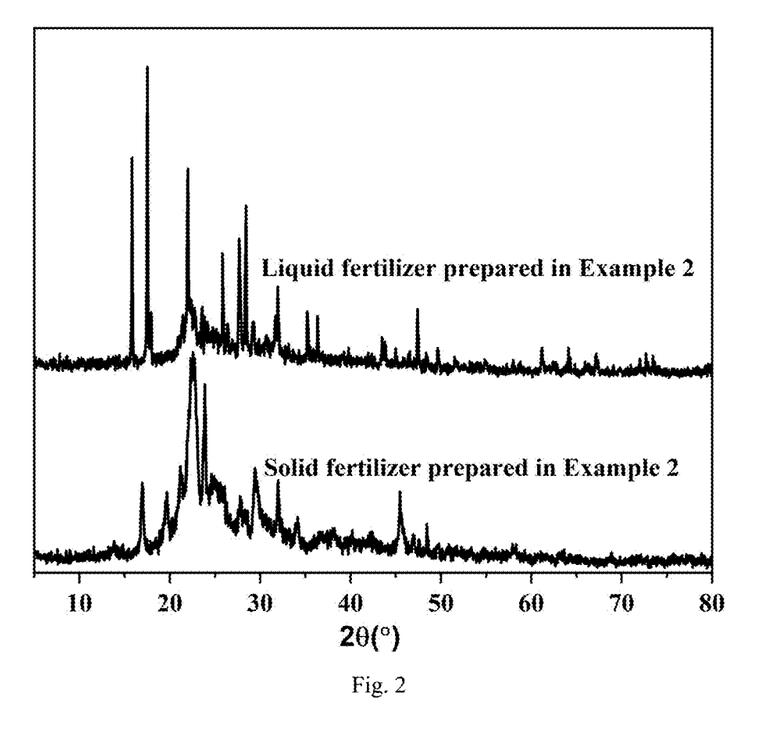
FIG. 2 shows X-ray diffraction (XRD) patterns of the UF-based multi-nutrient biodegradable polymeric SR liquid and granular fertilizers prepared in Example 2.

As shown in FIG. 2, the liquid fertilizer prepared in this embodiment showed an obvious characteristic diffraction peak of urea at 22.01°, but this peak was not significantly shown in the spectrum of the solid fertilizer, indicating that the residual amount of raw urea in the solid fertilizer was significantly reduced. Moreover, the characteristic diffraction peaks of UF appeared in the liquid fertilizer and the solid fertilizer at 22.64° and 24.95°, and the degree of crystallinity of the liquid fertilizer ($X_C$=32.45%) was lower than that of the solid fertilizer ($X_C$=48.37%), indicating that more cross-linking structures in the liquid fertilizer inhibited the regular arrangement of the molecular chains of the UF molecules. XRD spectra illustrated that the product had the described structure.

Figure 3A:
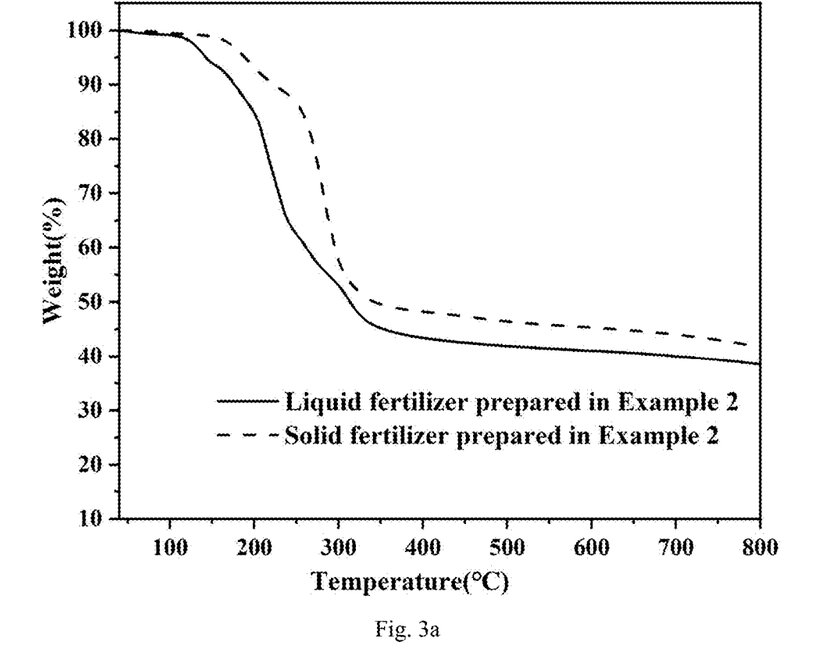
FIG. 3a shows thermogravimetric curves of the UF-based multi-nutrient biodegradable polymeric SR liquid and granular fertilizers prepared in Example 2.
Figure 3B:
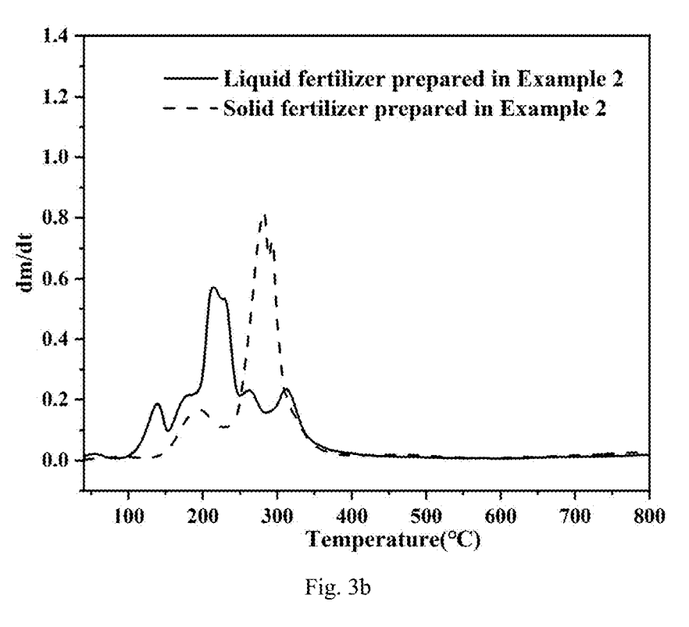
FIG. 3b shows thermogravimetric differential curves of the UF-based multi-nutrient biodegradable polymeric SR liquid and granular fertilizers prepared in Example 2.

As shown in FIGS. 3a-3b, the overall thermal stability of the liquid fertilizer prepared in this embodiment was lower than that of the solid fertilizer because the liquid fertilizer contained more unreacted small molecules of urea or UF oligomers. The thermogravimetric differential curves also showed that the thermal weight loss peaks of the liquid fertilizer at 100-250° C. was obviously higher than that of the solid fertilizer, indicating that the liquid fertilizer contains more urea or UF oligomers. While at 250-350° C., the thermal weight loss peak of the liquid fertilizer was significantly lower than that of the solid fertilizer, indicating that the content of highly-polymerized UF in the liquid fertilizer was lower than that in the solid fertilizer, due to the fact that the solid fertilizer underwent a high temperature curing process during the preparation process, and thus its UF molecule chain had a higher degree of polymerization. Thermogravimetric curves and thermogravimetric differential curve illustrated that the products had the described structures.

Figure 4A:
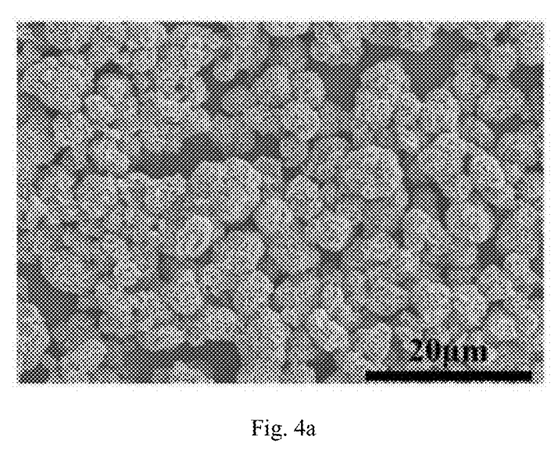
FIGS. 4a-4b show scanning electron microscope (SEM) images of the UF-based multi-nutrient biodegradable polymeric SR liquid fertilizer (a) and the UF-based multi-nutrient biodegradable polymeric SR granular fertilizer (b) prepared in Example 2.
Figure 4B:
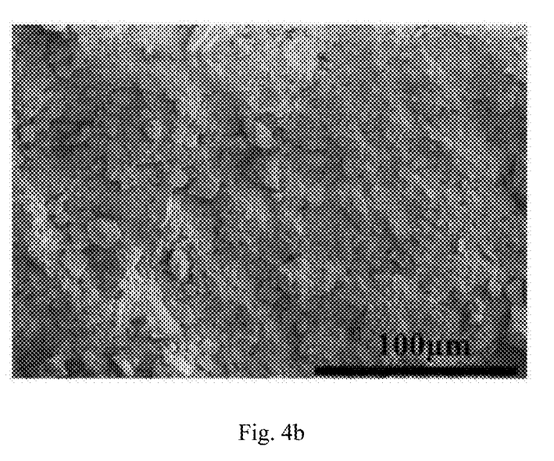

As shown in FIG. 4a, the liquid fertilizer prepared in this embodiment showed uniform flower-like particles with an average particle size of 4.76 μm. The smaller particle size rendered a dispersive stability of the liquid fertilizer in suspension. As shown in FIG. 4b, the solid fertilizer was made of UF particles through extrusion, stacking, and bonding, with a large number of microscopic cracks and pores on the surface, which enhanced its biodegradation rate. SEM images illustrated that the product had the described structure.

Figure 5:
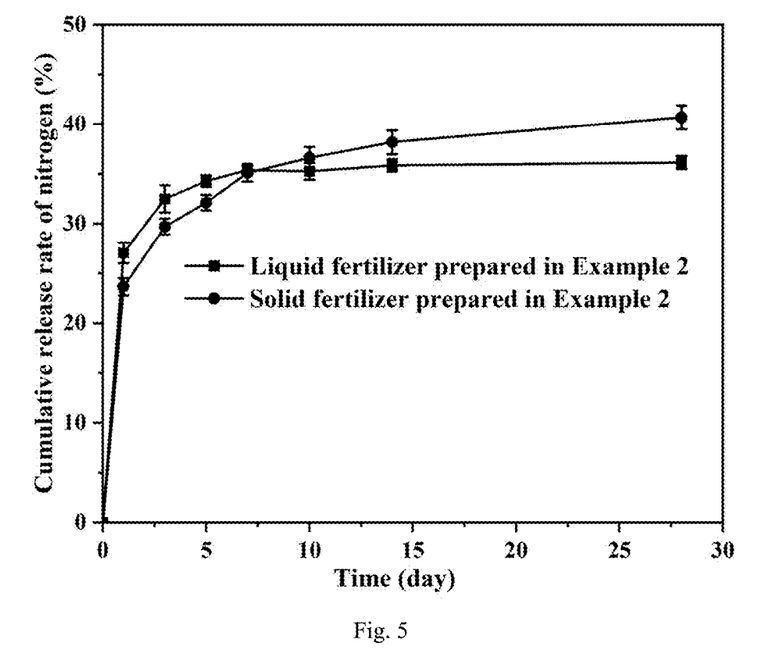
FIG. 5 shows hydrostatic release curves of the UF-based multi-nutrient biodegradable polymeric SR liquid and granular fertilizers prepared in Example 2.

As shown in FIG. 5, the nitrogen release rate of the liquid fertilizer prepared in this embodiment was higher than that of the solid fertilizer in 0-7 days, further indicating that the content of unreacted urea or UF oligomers in the liquid fertilizer was higher than that of the solid fertilizer. After 7 days, the nitrogen release rate of the liquid fertilizer was lower than that of the solid fertilizer, further indicating that the liquid fertilizer was more crosslinked. The cumulative nitrogen release rate of the liquid fertilizer and the solid fertilizer was lower than 80% in 28 days, indicating that both the liquid fertilizer and the solid fertilizer had a good slow-release effect, and were suitable for cash crops or field crops.

Example 3

A method for integrally preparing a urea-formaldehyde (UF)-based multi-nutrient biodegradable polymeric slow-release (SR) liquid fertilizer and a UF-based multi-nutrient biodegradable polymeric SR solid granular fertilizer, which included the following steps.

(1) Urea, paraformaldehyde, potassium carbonate and water were added to a reactor A for reaction at 70° C. for 1.5 h to obtain a hydroxymethylurea solution, where a molar ratio of the urea to the formaldehyde structural unit contained in paraformaldehyde was 2.1:1, an addition amount of the potassium carbonate was 0.05% of a total weight of the urea and the paraformaldehyde, and the water content in the reactor A is 25% of the total weight of the urea and the paraformaldehyde.

(2) One half of the hydroxymethylurea solution obtained in step (1) was added to a reactor B containing an acidic suspension, which was prepared from phosphoric acid, water and bentonite, followed by reaction at 30° C. for 1.0 h to obtain a UF thick liquid, where a phosphoric acid solute was 10 wt. % of the added water, and the addition amount of the bentonite was 1.0 wt. % of the water. The UF thick liquid was added to a mixed liquid prepared from potassium hydroxide, ammonium dihydrogen phosphate and gibberellin, followed by uniform mixing to obtain the UF-based multi-nutrient biodegradable polymeric SR liquid fertilizer, where a molar ratio of potassium hydroxide to potassium acid added to the acidic suspension was 3:1, a weight ratio of the ammonium dihydrogen phosphate to the urea in step (1) was 1:4, and a weight ratio of the gibberellin to the urea in step (1) was 0.05:1.

The die opening between the reaction unit and the extrusion unit of a reaction-extrusion integrated machine was sealed. Then, the other half of the hydroxymethylurea solution obtained in step (1) and the ammonium dihydrogen phosphate were pumped into a twin-screw reaction extruder of the reaction unit of the reaction-extrusion integrated machine, where a weight ratio of the ammonium dihydrogen phosphate to the urea in step (1) was 1:4. A screw of the twin-screw reaction extruder was turned on for reactive extrusion at 110° C. and 70 rpm for 10 min, and simultaneously a vacuumization-devolatilization device of the twin-screw reaction extruder was started to remove water in the reaction mixture, during which the hydroxymethylurea was transformed into a UF polymer through a polycondensation reaction. After that, the die opening between the reaction unit and the extrusion unit was opened, and the twin-screw extruder of the extrusion unit was turned on. The reaction mixture was conveyed to the twin-screw extruder by the twin-screw reaction extruder and extruded by the twin-screw extruder at 60° C. and 20 rpm to obtain a strip-shaped extrudate. The strip-shaped extrudate was dried at 120° C., followed by granulation to obtain the UF-based multi-nutrient biodegradable polymeric SR granular fertilizer.

The prepared UF-based multi-nutrient biodegradable polymeric SR liquid fertilizer contained 19.3 g/L of N, 9.7 g/L of $P_2O_5$, and 7.3 g/L of $K_2O$, and had an initial nitrogen nutrient release rate of 28.3%. When planting corn, the UF-based multi-nutrient biodegradable polymeric SR liquid fertilizer was applied using a liquid fertilizer sprayer with a dosage of 78 L/mu.

The prepared UF-based multi-nutrient biodegradable polymeric SR granular fertilizer contained 35.2 wt. % of N, 15.2 wt. % of $P_2O_5$ and 0.85 g/L of $K_2O$, and had an initial nitrogen nutrient release rate of 24%. When planting corn, the UF-based multi-nutrient biodegradable polymeric SR solid granular fertilizer was applied by using a seed and fertilizer co-sowing integrated machine with a dosage of 43 kg/mu.

The foregoing are only specific embodiments of the present disclosure to enable one of ordinary skill in the art to understand or realize the present disclosure. Although the present disclosure has been described in detail above, it should be understood that one of ordinary skill in the art can still modify the technical solutions disclosed in the preceding embodiments, or replace some or all of the technical features therein with equivalent ones. These modifications or replacements do not depart the essence of the technical solutions from the scope of the technical solutions of the corresponding embodiments, which shall be covered by the scope of protection of the appended claims.

What is claimed is:

1. A method for integrated preparation of a urea-formaldehyde (UF)-based multi-nutrient biodegradable polymeric slow-release (SR) liquid fertilizer and a UF-based multi-nutrient biodegradable polymeric SR granular fertilizer, comprising:
   (1) adding urea, formaldehyde, a catalyst, and water to a first reactor followed by a reaction at 50-90° C. for 0.5-3 h to obtain a hydroxymethylurea solution; wherein a molar ratio of the urea to the formaldehyde is 1.2-5:1; the catalyst is 0-5%, excluding 0%, of a total weight of the urea and the formaldehyde; and the water in the first reactor is 15-35% of the total weight of the urea and the formaldehyde; and
   (2) adding a first portion of the hydroxymethylurea solution obtained in step (1) to a second reactor containing an acidic suspension followed by a reaction at a first temperature $T_1$ for a first time $t_1$ to obtain a viscous UF liquid, wherein the acidic suspension is prepared from an acidic substance, water, and a suspending agent; and adding the viscous UF liquid to a mixed liquid prepared from an alkaline substance, a first fertilizer system containing at least one nutrient element except nitrogen, and a nutrient synergist, followed by mixing to obtain the UF-based multi-nutrient biodegradable polymeric SR liquid fertilizer; and
   feeding a second portion of the hydroxymethylurea solution obtained in step (1) and a second fertilizer system containing at least one nutrient element except nitrogen into a twin-screw reaction extruder of a reaction unit of a reaction-extrusion integrated machine, followed by a reactive extrusion process at a second temperature $T_2$ and a first screw speed $R_1$ for a second time $t_2$ to form a reaction mixture, wherein during the reactive extrusion process, hydroxymethylurea is transformed into a UF polymer through a polycondensation reaction; conveying, by the twin-screw reaction extruder, the reaction mixture to a twin-screw extruder of an extrusion unit of the reaction-extrusion integrated machine followed by extrusion at a third temperature $T_3$ and a second screw speed $R_2$ to obtain a strip-shaped extrudate; drying the strip-shaped extrudate at a fourth temperature $T_4$, followed by granulation to obtain the UF-based multi-nutrient biodegradable polymeric SR granular fertilizer.

2. The method of claim 1, wherein in step (1), the formaldehyde is selected from the group consisting of a formaldehyde aqueous solution, a solid paraformaldehyde, gaseous formaldehyde, and a combination thereof; and the catalyst is potassium carbonate, potassium hydroxide, or a combination thereof.

3. The method of claim 1, wherein in step (2), the first portion of the hydroxymethylurea solution is added to the acidic suspension by dripping, mist spraying, or pouring;
   the acidic substance is an inorganic acid or an organic acid, and is selected from the group consisting of sulfuric acid, hydrochloric acid, phosphoric acid, oxalic acid, citric acid, tartaric acid, and a combination thereof; and
   in the acidic suspension, the acidic substance is 0-80 wt. %, except 0 wt. %, of the water; the suspending agent is an inorganic suspending agent or an organic suspending agent, and is selected from the group consisting of attapulgite, bentonite, kaolin, lignin, humic acid, alginic acid, polyvinyl alcohol, colloidal protein, xanthan gum, cellulose, starch, and a combination thereof; and the suspending agent is 0-5 wt. %, except 0 wt. %, of the water.

4. The method of claim 1, wherein in step (2), the first temperature $T_1$ ranges from 25° C. to 90° C., and the first time $t_1$ is 0.1-2 h.

5. The method of claim 1, wherein in step (2), the alkaline substance is an inorganic base, a strong base-weak acid salt or an organic base, and is selected from the group consisting of sodium hydroxide, potassium hydroxide, potassium carbonate, potassium phosphate, an organic amine compound, and a combination thereof.

6. The method of claim 1, wherein in step (S2), the second temperature $T_2$ is 50-130° C.; the first screw speed $R_1$ is 5-150 rpm; the second time $t_2$ is 1-30 min; the third temperature $T_3$ is 50-130° C.; the second screw speed $R_2$ is 5-150 rpm; and the fourth temperature $T_4$ is 60-150° C.

7. The method of claim 1, wherein in step (S2), the first fertilizer system and the second fertilizer system are independently selected from the group consisting of a phosphate, a potassium salt, calcium sulphate, magnesium sulphate, ferrous sulfate, manganese sulfate, zinc sulfate, copper sulfate, boric acid, sodium silicate, and a combination thereof;
   the phosphate is selected from the group consisting of hydroxyapatite, ammonium dihydrogen phosphate, calcium superphosphate, potassium dihydrogen phosphate, and a combination thereof; and the potassium salt is selected from the group consisting of potassium sulphate, potassium chloride, potassium nitrate, potassium carbonate, potassium silicate, and a combination thereof; and the nutrient synergist is selected from the group consisting of a humic acid, an amino acid, a seaweed extract, gibberellin, auxin, and a combination thereof.

8. The method of claim 1, wherein step (S2) further comprises:

sealing a die opening between the reaction unit and the extrusion unit before feeding the second portion of the hydroxymethylurea solution into the twin-screw reaction extruder; and after feeding the second portion of the hydroxymethylurea solution into the twin-screw reaction extruder, turning on screws of the twin-screw reaction extruder, and simultaneously starting a vacuumization-devolatilization device of the twin-screw reaction extruder to remove water in the reaction mixture; opening the die opening between the reaction unit and the extrusion unit; and turning on the twin-screw extruder of the extrusion unit such that the reaction mixture is conveyed by the twin-screw reaction extruder to the twin-screw extruder.

* * * * *